No. 620,944. Patented Mar. 14, 1899.
H. W. MATHER.
ROTARY PAPER CUTTER.
(Application filed Nov. 18, 1898.)
(No Model.)
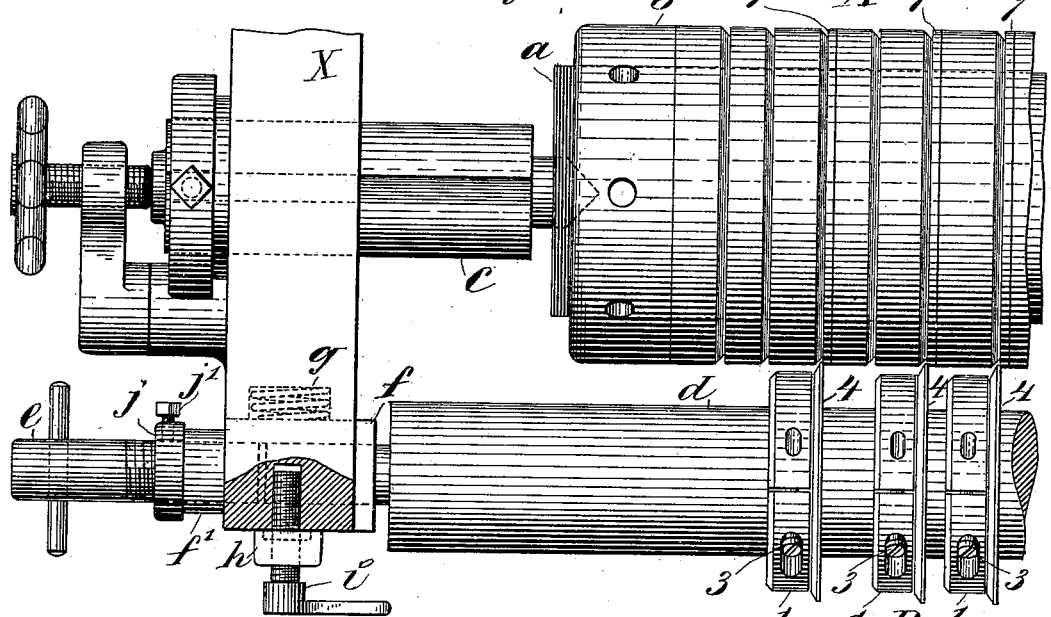
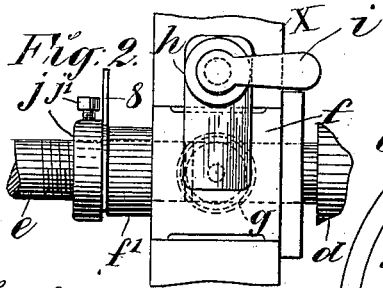
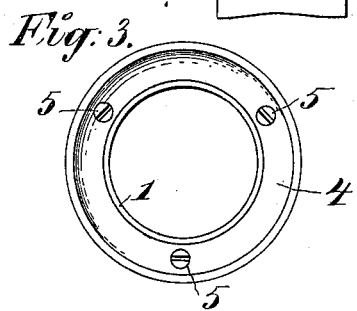
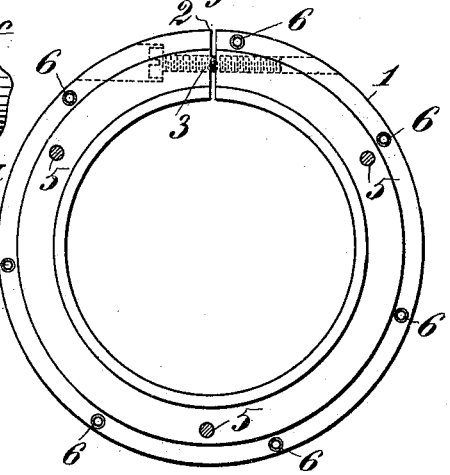
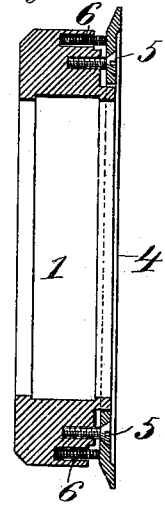
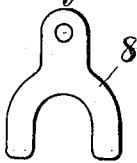
WITNESSES:
INVENTOR
Henry W. Mather
BY
Attorney

UNITED STATES PATENT OFFICE.

HENRY W. MATHER, OF ROSEVILLE, NEW JERSEY, ASSIGNOR OF ONE-HALF TO GEORGE W. MILLAR AND WILLIAM D. MAY, OF NEW YORK, N. Y.

ROTARY PAPER-CUTTER.

SPECIFICATION forming part of Letters Patent No. 620,944, dated March 14, 1899.

Application filed November 18, 1898. Serial No. 696,755. (No model.)

*To all whom it may concern:*

Be it known that I, HENRY W. MATHER, a citizen of the United States, residing at Roseville, Essex county, New Jersey, have invented certain new and useful Improvements in Rotary Paper-Cutters, of which the following is a specification.

This invention relates to that class of paper-cutters wherein a pair of circular shear-like rotating cutters act to cut or slit the paper passing between them. It is common in this class of paper-cutting machines to mount on an arbor a plurality of circular inner cutters, usually of relatively large diameter, and to mount on an adjacent and parallel arbor a corresponding number of smaller ring-like exterior cutters, which may be set up firmly to the inner cutters by an endwise adjustment of their arbor. The inner and exterior cutters overlap slightly at their peripheries and are applied laterally, face to face, so as to operate like the blades of shears. Much difficulty has been found in operating cutters of this description, arising from the difficulty of adjusting the series of cutters on one arbor up laterally to those on the other arbor with the same degree of closeness throughout, and the result has been that while the cutters of one pair may fit so closely as to abrade and nick each other those of another pair may not fit together closely enough to cut the paper smoothly. To overcome this difficulty is the object of the present invention, which will now be described with reference to the accompanying drawings, which illustrate an embodiment thereof.

Figure 1 is a fragmentary view of a part of a paper-cutting machine embodying my invention, and Fig. 2 is a face view of the device for adjusting the overlapping of the cutters. Fig. 3 is a face view of one of the lesser or exterior cutters detached and on the same scale as the principal views. Fig. 4 is a face view, on a larger scale, of the base collar or holder of the exterior cutter as it appears when the ring cutter is removed therefrom; and Fig. 5 is a diametrical section of the exterior cutter as a whole. Fig. 6 shows the gage used in setting up the exterior cutters.

The principal novel feature of this invention lies in the exterior cutter illustrated in Figs. 3, 4, and 5, and this cutter will be first described.

1 is a base-collar, made to fit quite snugly on the cutter-mandrel and cut across at 2, so that when set in place on the mandrel it may be clamped firmly thereon by a binding-screw 3, adapted to draw the ends together at the cut. Such a cut collar is not of itself new.

4 is a ring cutter of a known form attached to the base-collar 1 by screws 5, usually three in number, equally spaced, as seen in Fig. 3. This ring cutter fits in a rabbet formed on the outer face of the collar, so that it is maintained concentric with the mandrel when in place on the collar, the screws preventing the ring cutter from rotating independently and compelling it to rotate with said collar. The screws 5, however, do not draw the ring cutter up close to the face of the collar, but leave it free to be moved toward or from said face for a limited distance, the heads of the screws limiting its outward movement from the collar.

Behind the ring cutter 4 are a number of helical compression-springs 6, occupying bores or sockets in the face of the collar exterior to the screws. As herein shown, there are seven of the springs equally spaced, although the exact number is not essential. These springs bear against the back of the ring cutter, and they are normally compressed. They should be of equal tension, and there should be enough of them to exert a practically uniform pressure on the ring cutter all around its margin.

In Fig. 1 the inner cutters are represented as a whole by A and the outer or exterior cutters as a whole by B.

In Figs. 1 and 2, X represents the end frame of the paper-cutting machine. $a$ is the arbor on which the cutters A are mounted, they being pressed together by a capstan-nut $b$. $c$ is the end support for the arbor $a$. The arbor $d$ for the cutters B has a screw-threaded end support $e$, which screws through a block $f$, the latter being mounted in a keeper-bearing or recess in the frame X and backed by a cushion-spring $g$, indicated in dotted lines. The bearing-block $f$ is held in place by a clip $h$ and a clip-screw $i$.

In each of the cutters A are formed one or more circumferential grooves which produce each a cutting-shoulder 7, and the periphery of the ring cutter 4 enters said groove so as to slightly overlap the shoulder 7, the face of the cutter being set up into contact with the shoulder.

After the cutters B are set up as well as may be to the respective shoulders on the cutters A a stop-collar $j$ on the end support $e$ is run back far enough to insert a thin gage-fork 8 between said collar $j$ and the end of a projecting sleeve $f'$ on the block $f$, as seen in Fig. 2. The collar $j$ is now set fast by its set-screw $j'$, the gage 8 removed, and the support $e$ screwed in until the collar $j$ comes to a bearing on the sleeve $f'$. The effect of this is to drive the arbor $d$ endwise and to cause compression of the springs 6 between the collars 1 and ring cutters 4 of the respective exterior cutters B and the pressure of the ring cutters 4 up to the respective shoulders on the cutters A with an elastic pressure, which will be substantially the same throughout the entire series of cutters B. The effect is also to insure that each ring cutter 4 has a proper bearing on the shoulder of the opposite cutter A, but not a rigid bearing, such as would cause abrading or chipping of the cutters. The considerable elastic play allowed by the springs 6 on the one hand and the firm pressure which they exert on the cutters to keep them pressed together on the other hand conduce to produce an equally perfect cutting device for sheets of paper at all of the cutting-points.

It will be noted that the springs 6, of equal tension, bear directly on the back of the ring cutter out near the cutting edge thereof, and as the cutter is quite thin and fits movably on the screws 5, which secure it directly to the fixed collar 1, the said cutter is perfectly free to adapt itself to the exterior cutter B. This construction is very simple and inexpensive and so compact that the entire cutter, as seen in Fig. 5, is relatively thin, so that the cutters may be placed quite close together for cutting narrow strips of paper.

Having thus described my invention, I claim—

1. A cutter for a paper-cutting machine, comprising a base-collar 1, provided with means for securing it on an arbor, a ring cutter 4, connected to the face thereof by means which permit a limited movement of the cutter toward and from the collar but prevent independent rotation thereof, and a plurality of metal springs distributed about the circumference of the cutter 4, and compressed between it and the said base, substantially as and for the purposes set forth.

2. A cutter for a paper-cutting machine, comprising a base-collar 1, having means for securing it to an arbor, and a rabbet in its face concentric with the aperture in the collar, a ring cutter 4, mounted in said rabbet and connected to the collar by screws 5, the said screws, adapted to permit a limited movement of the cutter toward and from said collar, and a plurality of equally-spaced, helical, wire springs 6, set in bores in the collar and bearing at their outer ends on the back of the cutter 4, substantially as and for the purposes set forth.

3. The combination with an arbor, of a cutter mounted on said arbor, said cutter comprising the collar 1, fixed on the arbor, the ring cutter 4, connected movably to the face of said collar but so that it is compelled to rotate with the arbor, a plurality of coil-springs 6, set in recesses in the face of the said collar and bearing at their outer ends against the face of the ring cutter, said springs being of uniform tension and uniformly disposed about the circumference of said collar, and means for limiting the extent of movement of the cutter under the pressure of the springs, substantially as set forth.

4. In a paper-cutting machine, the combination with a series of rotatively-mounted cutters A, having shoulders 7, of the arbor $d$, the screw-threaded support $e$ for said arbor, the bearing-block $f$, the stop-collar $j$ on the support $e$, adapted to be set at a gaged distance from the bearing-block, and a series of cutters B, on the arbor $d$, said cutters each comprising a base-collar 1, adapted to be secured on the said arbor, a ring cutter 4 secured loosely to the face of the collar, and a plurality of helical wire springs 6, between the face of said collar and the back of said cutter 4, substantially as set forth.

In witness whereof I have hereunto signed my name, this 25th day of October, 1898, in the presence of two subscribing witnesses.

HENRY W. MATHER.

Witnesses:
HENRY CONNETT,
PETER A. ROSS.